(12) United States Patent
Tardif

(10) Patent No.: US 7,765,963 B2
(45) Date of Patent: Aug. 3, 2010

(54) INTERNAL COMBUSTION ENGINE

(76) Inventor: Jean-Marc Tardif, 277-2 St-Robert, Rimouski, Quebec (CA) G5L 4S7

( * ) Notice: Subject to any disclaimer, the term of this patent is extended or adjusted under 35 U.S.C. 154(b) by 674 days.

(21) Appl. No.: 11/702,136

(22) Filed: Feb. 5, 2007

(65) Prior Publication Data

US 2007/0181101 A1 Aug. 9, 2007

(30) Foreign Application Priority Data

Feb. 4, 2006 (GB) .................................. 0602268.5

(51) Int. Cl.
*F01B 13/04* (2006.01)

(52) U.S. Cl. ..................... 123/43 B; 123/43 R; 418/35; 418/34

(58) Field of Classification Search ....... 123/43 R–43 C
See application file for complete search history.

(56) References Cited

U.S. PATENT DOCUMENTS

| 150,350 | A | * | 4/1874 | Palmer .......................... 418/34 |
| 1,298,610 | A | * | 3/1919 | Werle ......................... 123/43 B |
| 1,349,054 | A | * | 8/1920 | Fischer ....................... 123/43 B |
| 2,142,706 | A | * | 1/1939 | Wolstenholme .............. 418/33 |
| 2,170,213 | A | * | 8/1939 | Prew ........................... 123/43 B |
| 2,280,967 | A | * | 4/1942 | Nelson ....................... 123/43 B |
| 3,731,661 | A | * | 5/1973 | Hatfield et al. ............. 123/43 C |
| 3,739,755 | A | * | 6/1973 | Folstadt ...................... 123/43 B |
| 3,885,532 | A | * | 5/1975 | Pike ........................... 123/43 B |
| 3,938,480 | A | * | 2/1976 | Yanda ......................... 123/43 B |
| 4,057,039 | A | * | 11/1977 | Pinto .......................... 123/43 B |
| 4,434,751 | A | * | 3/1984 | Pavincic ..................... 123/43 B |
| 5,199,391 | A | * | 4/1993 | Kovalenko ................. 123/43 B |

\* cited by examiner

*Primary Examiner*—Thomas Denion
*Assistant Examiner*—Douglas J. Duff

(57) ABSTRACT

An internal combustion engine usable for producing a rotational output, the internal combustion engine comprising: a casing; a cylinder defining a cylinder head and a combustion chamber extending from the cylinder head, the combustion chamber being substantially arc segment shaped and defining a chamber radius of curvature, the cylinder being mounted to the casing so as to be movable relatively thereto along a substantially annular path extending in a substantially concentric relationship relatively to the combustion chamber, the substantially annular path having a path radius of curvature substantially similar to the chamber radius of curvature; a piston, the piston being operatively coupled to the cylinder so as to be reciprocatingly movable within the combustion chamber, the piston being mounted to the casing so as to be movable relatively thereto along the substantially annular path; an output element operatively coupled to the cylinder and to the piston for producing the rotational output; and a unidirectional coupler operatively coupling at least one of the cylinder and the piston to the casing such that the at least one of the cylinder and the piston is unidirectionally movable relatively to the casing.

11 Claims, 9 Drawing Sheets

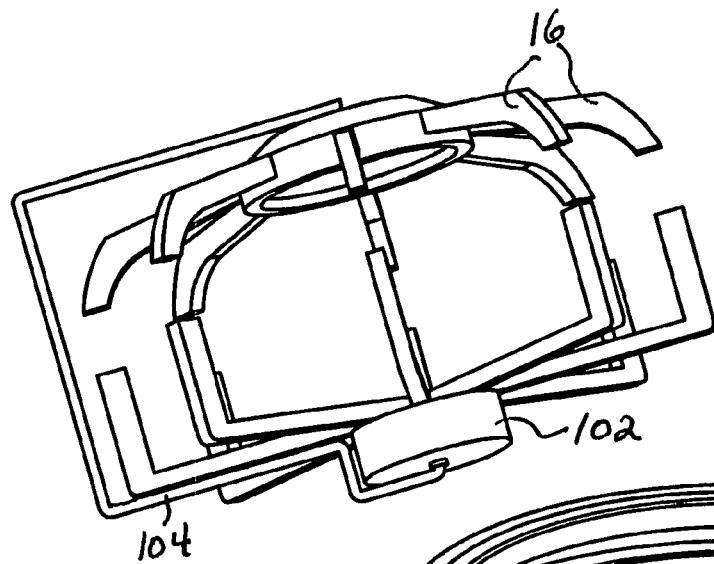
Fig 4
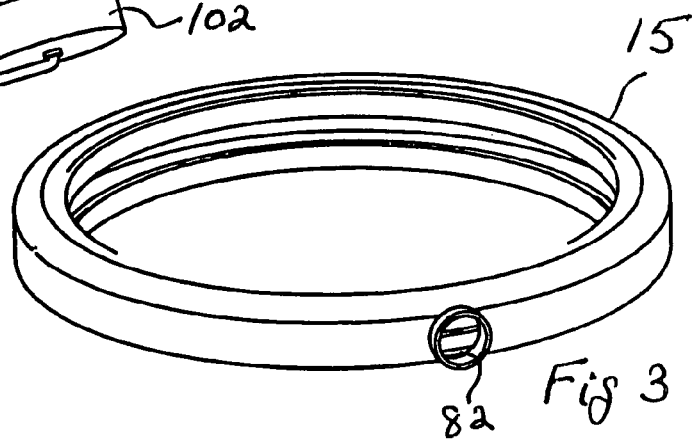
Fig 3
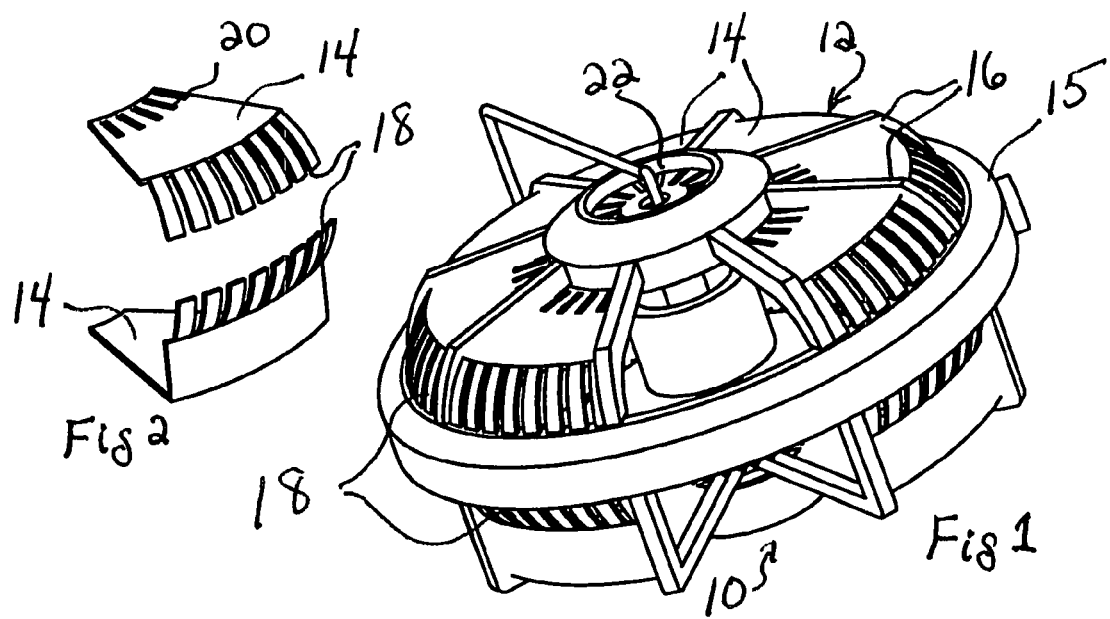
Fig 2
Fig 1

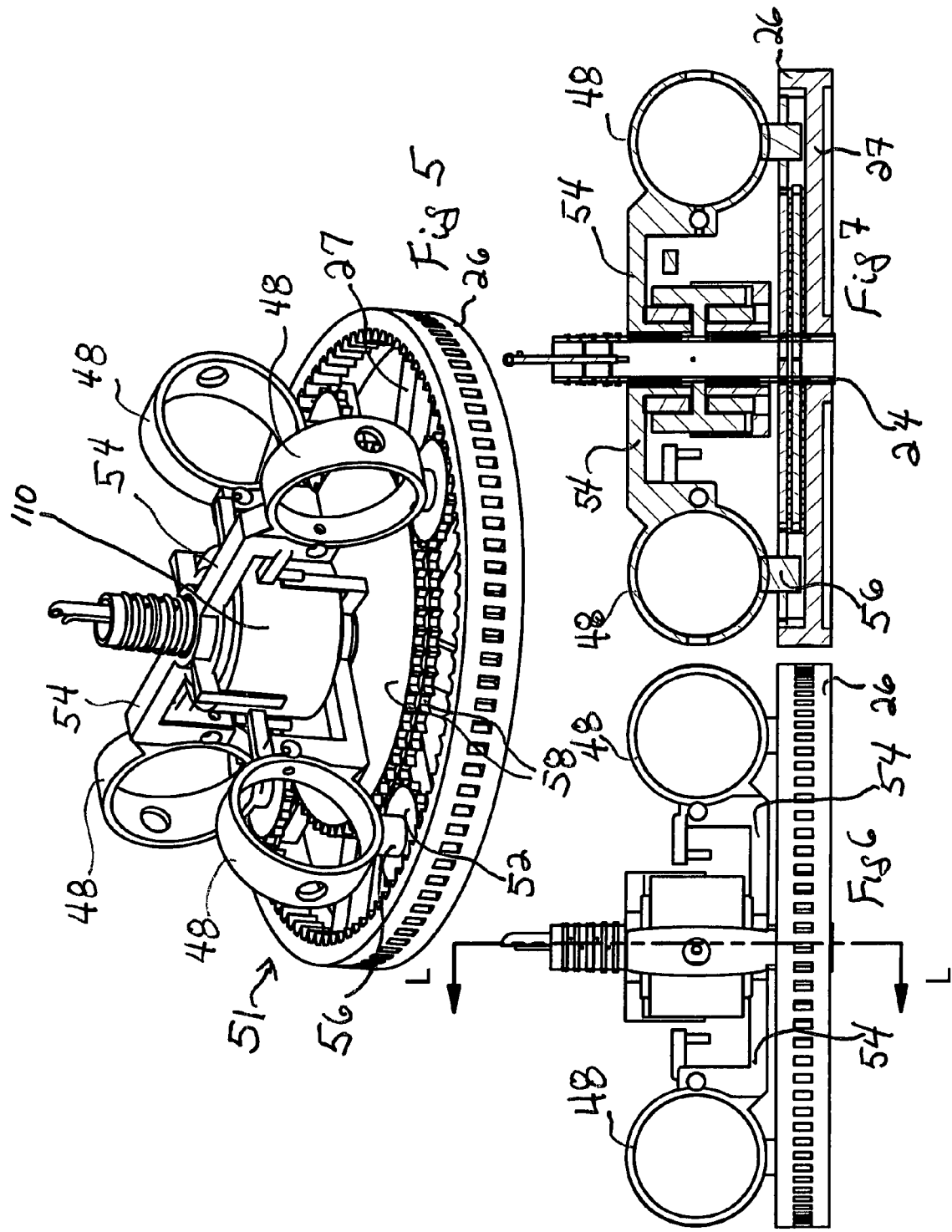

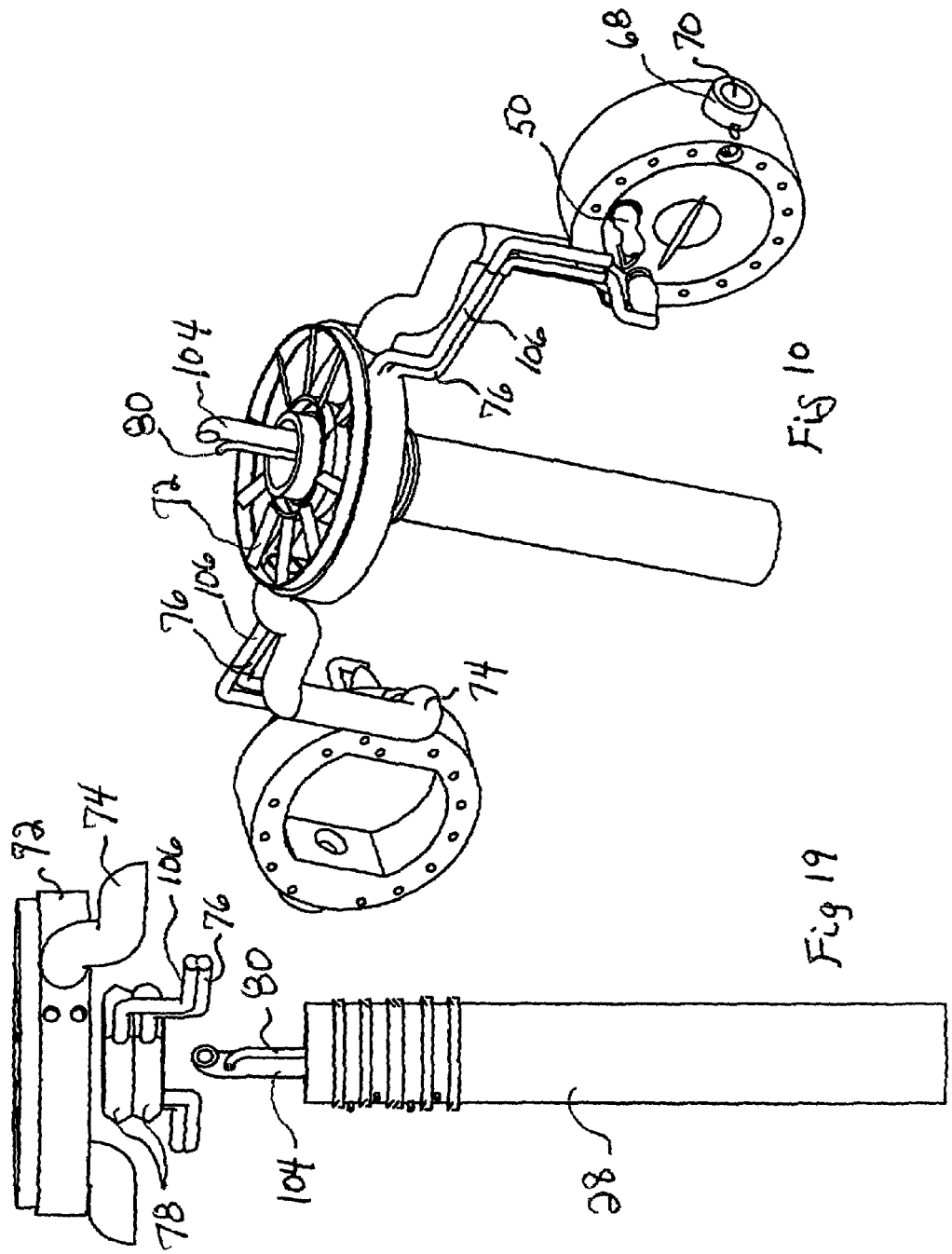

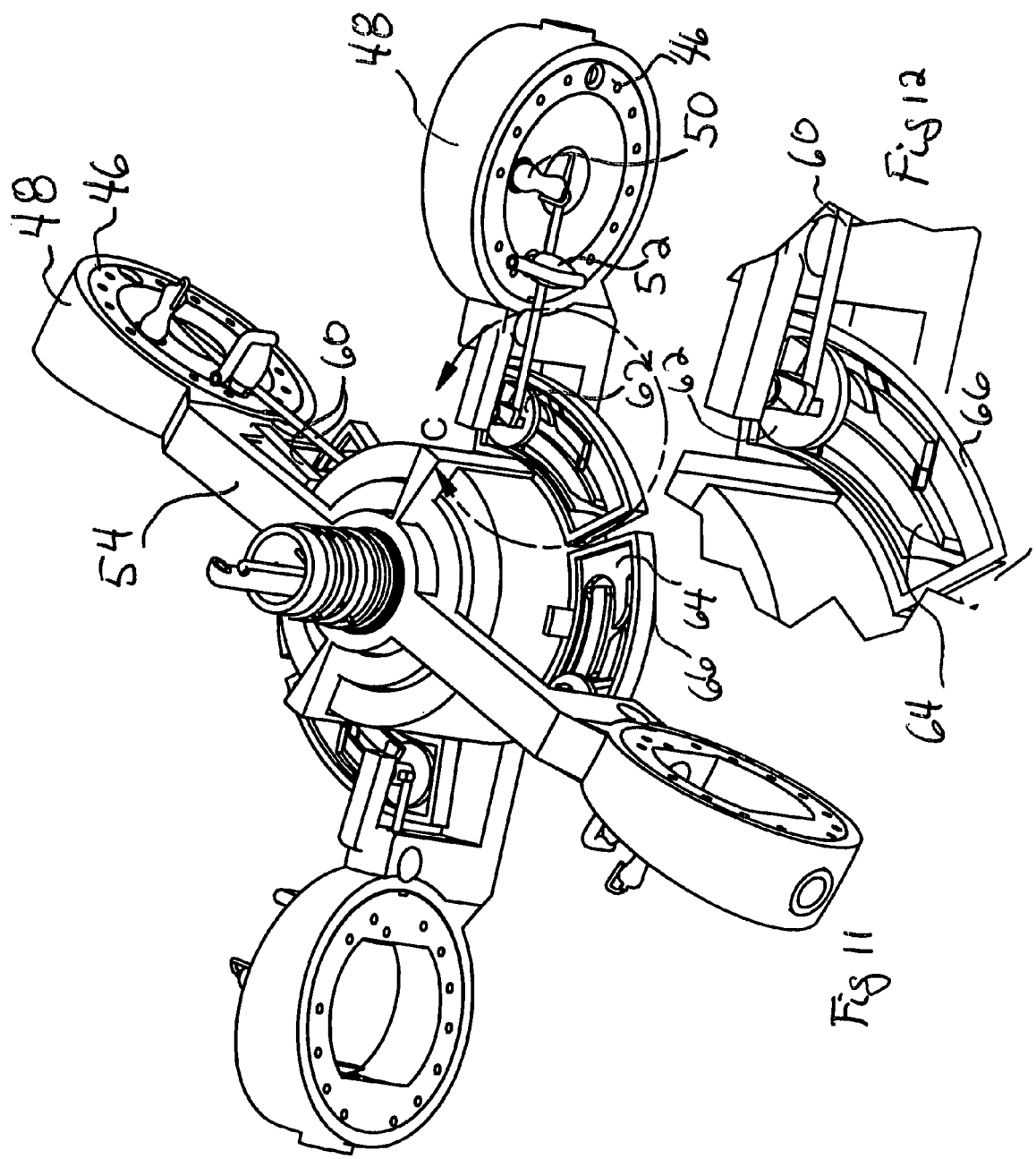

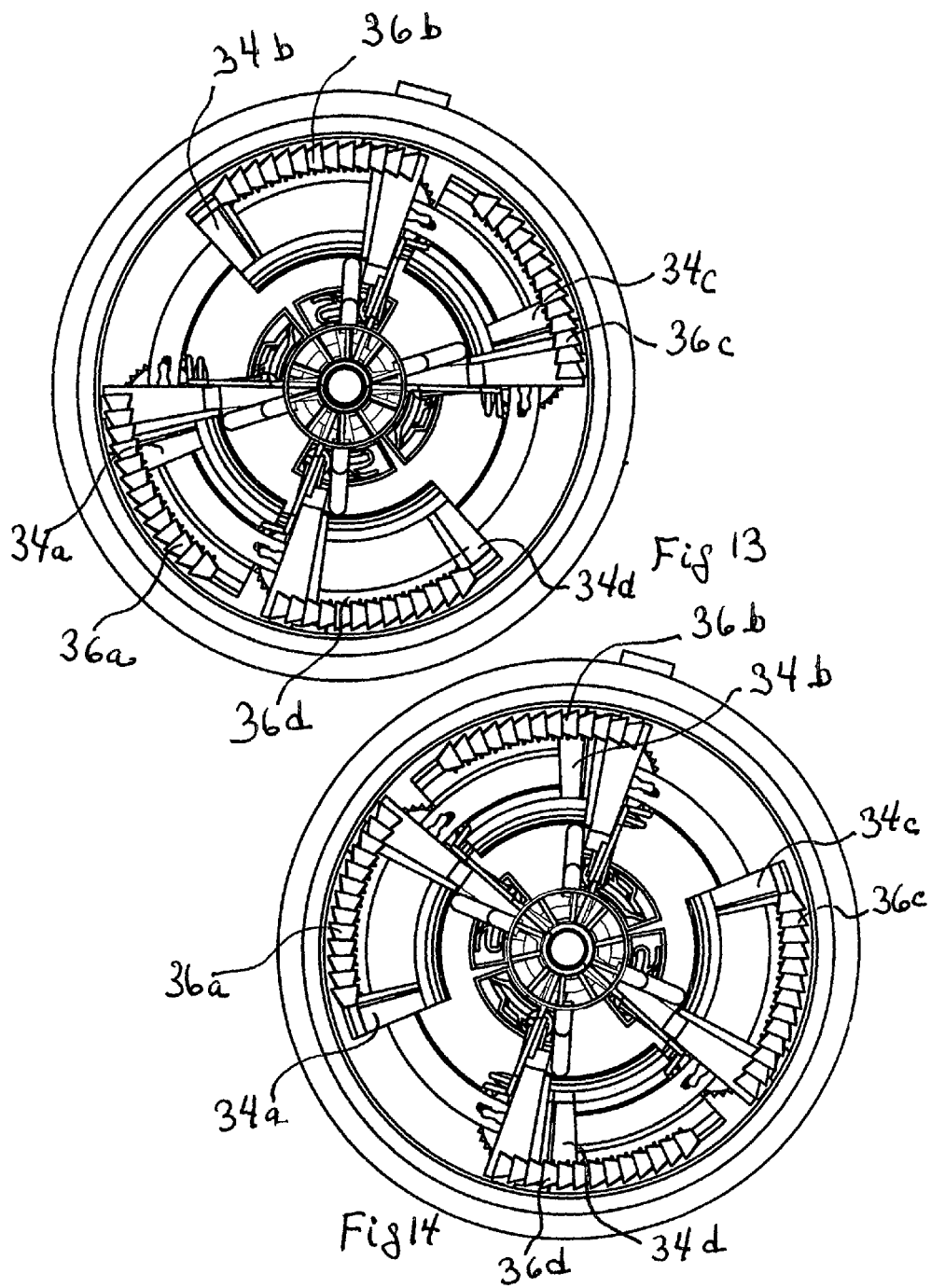

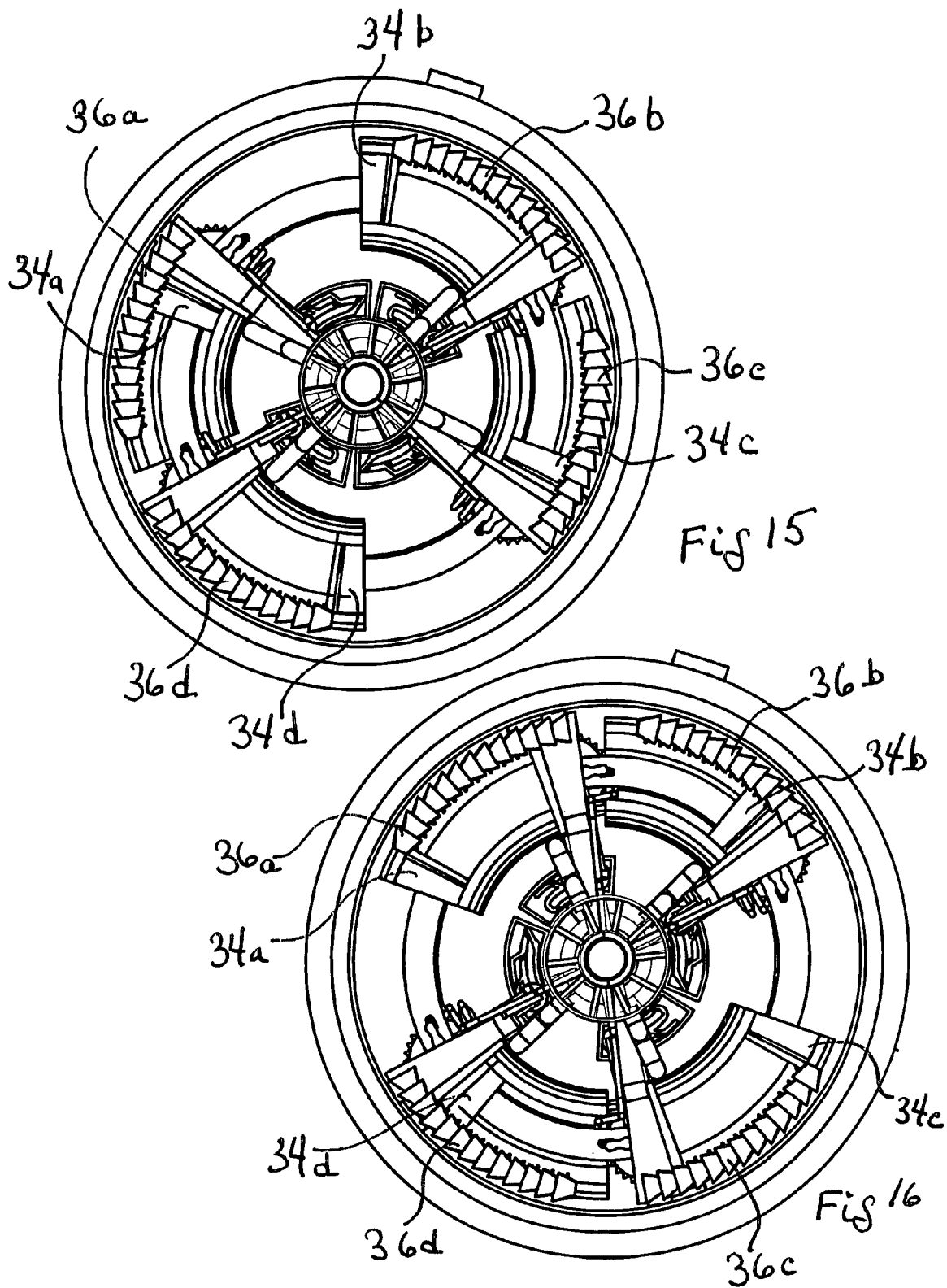

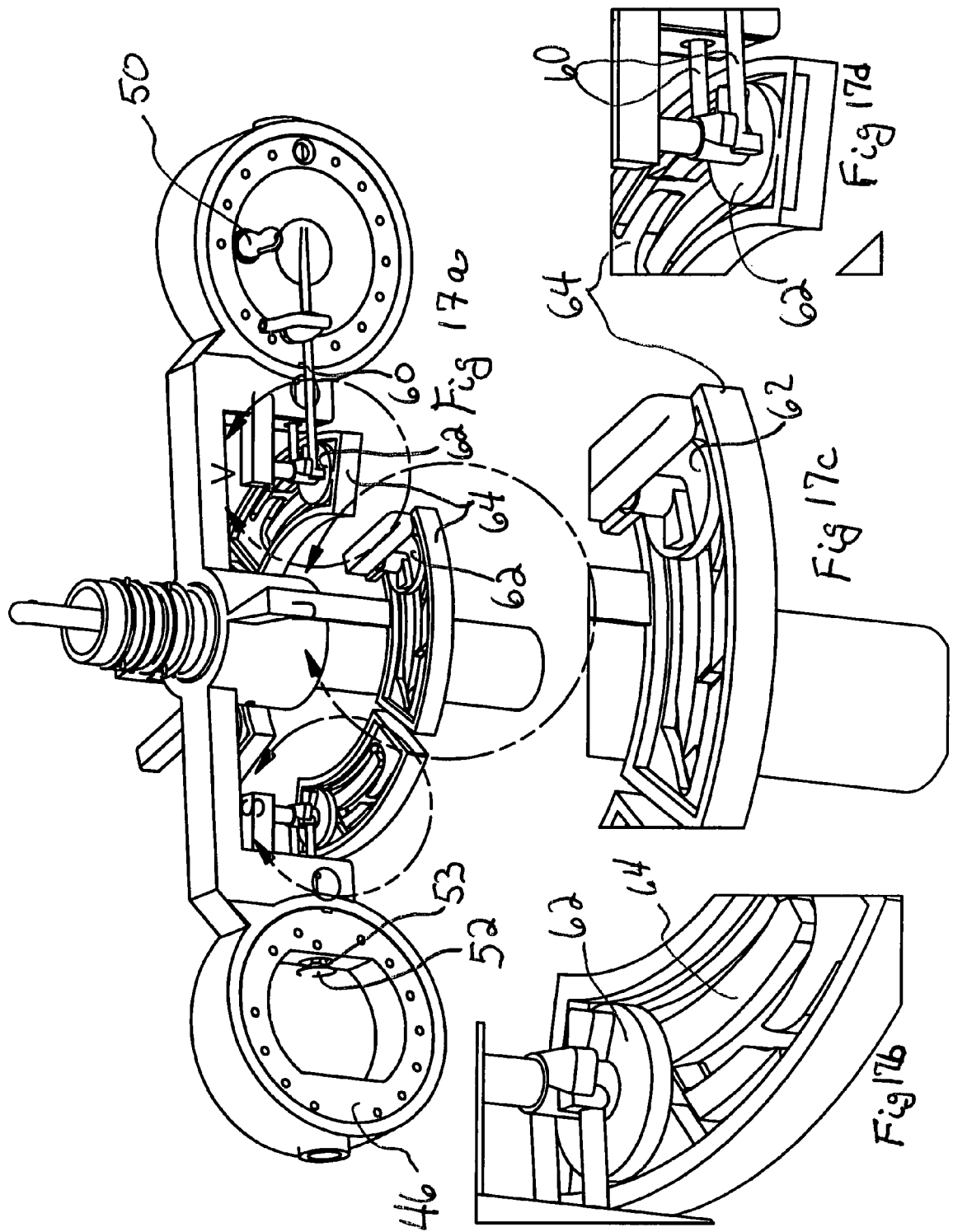

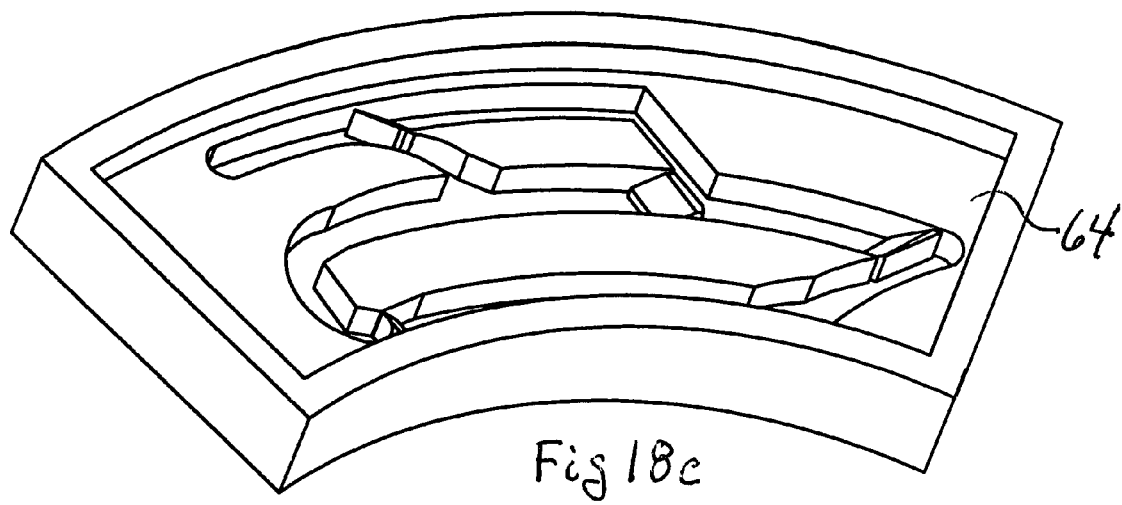
Fig 18c
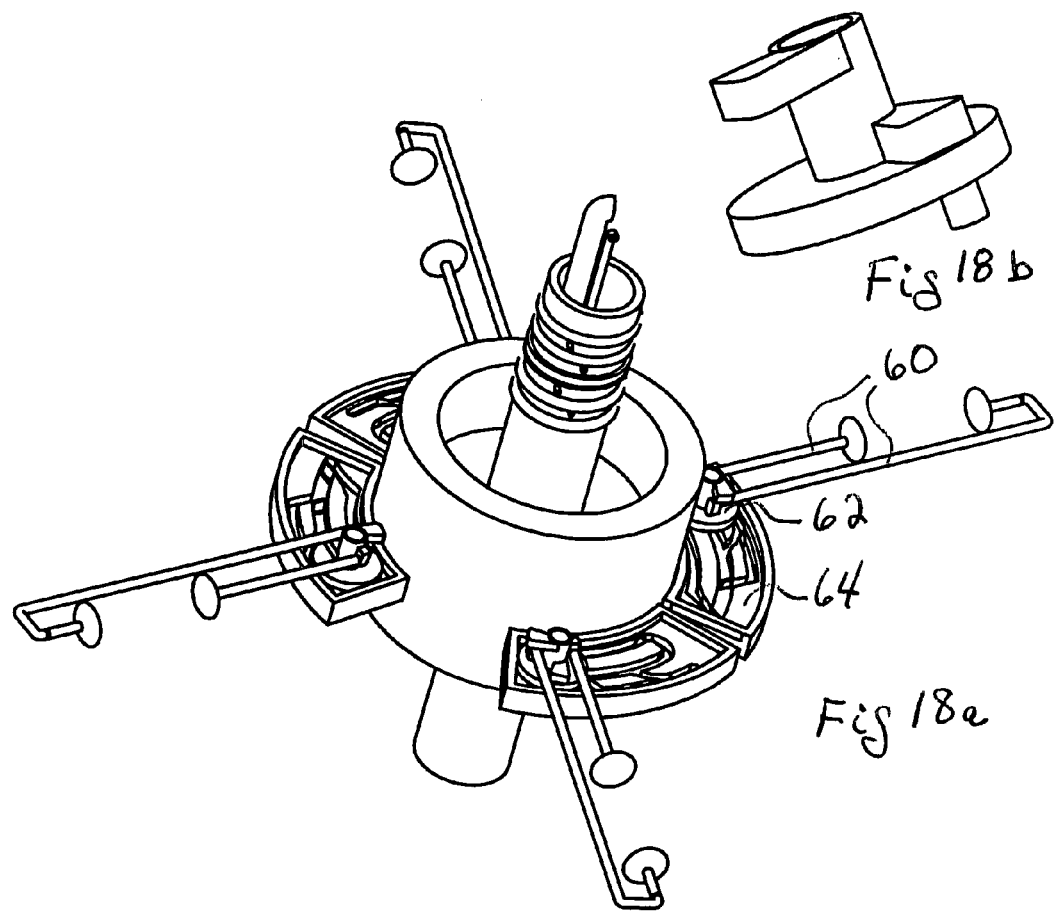
Fig 18b
Fig 18a

INTERNAL COMBUSTION ENGINE

FIELD OF THE INVENTION

The present invention relates to the general field of internal combustion engines.

BACKGROUND OF THE INVENTION

Internal combustion engines are used for converting thermal energy into kinetic energy. It is well known, by the combustion of a fuel-air mixture in the interior of a cylinder, a high pressure is created which works on a piston connected to a connecting rod and crankshaft system to effect the rotation of a drive shaft. Conventional internal combustion engines typically include a set of hollow cylinders, typically circular in cross-section and linear along their major axis. The pistons of these conventional internal combustion engines typically reciprocate linearly within their corresponding cylinders and respond to combustion pressures and shaft rotation. The linear reciprocal motion of the pistons is transferred to a rotational motion by means of a pivoting and offset connecting rod and crankshaft.

Two major classes of internal combustion engines have heretofore found widespread practical applications. One of these classes is of the oscillating piston type such as the Otto-cycle engine and its alternatives and the diesel engine and its alternatives. The other major class of internal combustion engines is that of the rotary-type piston exemplified by the Wankel-type motor and its alternative constructions.

Although useful, internal combustion engines related to the first hereinabove-mentioned class nevertheless suffer from several disadvantages. Some of these disadvantages considerably limit the maximum efficiency of these motors to about 25% to 30%.

Examples of disadvantages associated with the first class of motors include that two complete revolutions of the drive shaft are necessary in order to effect the necessary operating cycle of four strokes (induction, compression, expansion and exhaust). This means that, for two revolutions, the work of only one explosion is available and, accordingly, the torque is correspondingly low.

Also, the uniformity factor of the customary four-stroke engine is small and the use for mechanical power output is yet further reduced by the valve drive. Furthermore, such engines are associated with substantial thermal losses relative to the power of the engine.

The prior art engines associated with this first class also suffer from the complexity of the overall engine construction and the relatively high manufacturing costs connected therewith on account of the large number of moving parts, the uneven upward and downward movement of the pistons, the shape and method of manufacture of the crankshaft and the necessary cylinder head construction.

Prior art internal combustion engines associated with the hereinabove-designated second major class of engines also suffer from important disadvantages. Such disadvantages include the still eccentric mounting of the piston on the driveshaft. The irregularity of the operation chamber, which adversely effects the functioning of the motor. One of the major one, is the thermal lost into the use surface of the operation chamber.

Also, because of the triangular form of the circular piston sealing, problems arise which give rise to a lost in the power of the engine. Also, because of the geometry of the operation chamber, substantial fuel-air mixture losses arise. Still furthermore, the torque is, in comparison, larger than that of the oscillating piston engines. However, in principle, it cannot substantially be raised any further.

Yet, still furthermore, with some engines of this class, the transfer of force from the circular piston by means of relatively poorly designed gear-teeth system onto the drive shaft is associated with friction losses and noise.

Accordingly, there exists a need for an improved internal combustion engine. It is a general object of the present invention to provide such an improved internal combustion engine.

SUMMARY OF THE INVENTION

In a first broad aspect, the invention provides an internal combustion engine usable for producing a rotational output, the internal combustion engine comprising:
a casing;
a cylinder defining a cylinder head and a combustion chamber extending from the cylinder head, the combustion chamber being substantially arc segment shaped and defining a chamber radius of curvature, the cylinder being mounted to the casing so as to be movable relatively thereto along a substantially annular path extending in a substantially concentric relationship relatively to the combustion chamber, the substantially annular path having a path radius of curvature substantially similar to the chamber radius of curvature;
a piston, the piston being operatively coupled to the cylinder so as to be reciprocatingly movable within the combustion chamber, the piston being mounted to the casing so as to be movable relatively thereto along the substantially annular path;
an output element operatively coupled to the cylinder and to the piston for producing the rotational output; and
a unidirectional coupler operatively coupling at least one of the cylinder and the piston to the casing such that the at least one of the cylinder and the piston is unidirectionally movable relatively to the casing.

Advantages of the present invention include that the proposed internal combustion engine is designed so as to circumvent most of the hereinabove-mentioned disadvantages.

The proposed internal combustion engine is designed such that the pressure generated by explosion within the chambers of the device is exerted in a substantially tangential orientation relative to the main shaft thereof. Also, the number of revolutions of the main shaft is now proportional to the number of explosions. Hence, the rotational speed of the motor is increased relative to conventional linear-type motors.

Furthermore, contrarily to some of the prior art rotary-type motors, the proposed internal combustion engine allows for the use of more than two, and typically four, piston/chamber combinations. Although typically four pistons are used in the present invention, each piston is nevertheless able to travel substantially across a range of 40 degrees.

Still furthermore, the proposed internal combustion engine has several structural advantageous structural characteristics including the fact that each radial arm thereof each supports both the piston and a corresponding chamber. Diametrically opposed piston and corresponding are linked together so as to provide a somewhat scissor-type movement. Also, the proposed motor is deprived of a rotor. The structural characteristics allow for a somewhat lighter, less cumbersome, more economic, more reliable and efficient internal combustion engine.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

An embodiment of the present invention will now be disclosed, by way of example, in reference to the following drawings in which:

FIG. 1, in a perspective view, illustrates the external appearance of an internal combustion engine in accordance with an embodiment of the present invention;

FIG. 2, in a perspective view, illustrates some of the features of the external casing of the internal combustion engine shown in FIG. 1;

FIG. 3, in a perspective view, illustrates some of the features of the external casing of the internal combustion engine shown in FIG. 1;

FIG. 4, in a perspective view, illustrates part of an oil circuitry used with the internal combustion engine shown throughout the Figures;

FIG. 5, in perspective views with sections taken out, illustrates a planetary system part of the internal combustion engine shown in FIGS. 1 through 4;

FIG. 6, in side elevation view with sections taken out, illustrates the planetary system part of the internal combustion engine shown in FIGS. 1 through 5;

FIG. 7, in cross-sectional view along the line L-L of FIG. 6 with sections taken out illustrates a planetary system part of the internal combustion engine shown in FIGS. 1 through 6;

FIG. 10, in a perspective view, illustrates some of the details of an air, fuel and oil distribution system part of the internal combustion engine in accordance with the present invention;

FIG. 11, in a perspective view with sections taken out, illustrates a valve actuator associated with the internal combustion engine in accordance with the present invention;

FIG. 12, in a perspective view with sections taken out, illustrates details of the valve actuator shown in FIG. 11;

FIGS. 13 to 16, in respective top views with sections taken out, illustrate schematically the four-stroke cycle of the internal combustion engine shown throughout the Figures;

FIGS. 17a to 17d, in perspective views with sections taken out, illustrates details of the valve actuator shown in FIG. 11;

FIGS. 18a to 18c, in perspective views with sections taken out, illustrates details of the valve actuator shown in FIG. 11;

FIG. 19, in a side elevation view, illustrates some of the details of an air, fuel and oil distribution system part of the internal combustion engine in accordance with the present invention;

DETAILED DESCRIPTION

Figure 8:
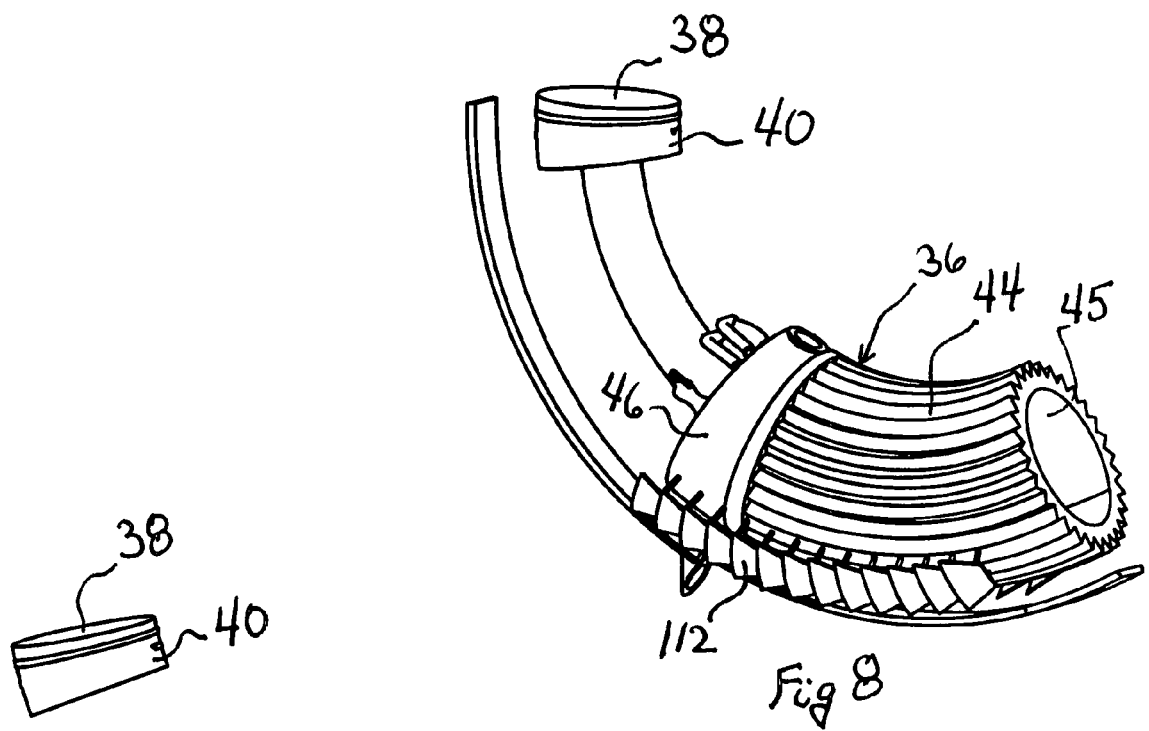
FIG. 8, in a perspective view, illustrates some of the details of cylinders and pistons part of the internal combustion engine in accordance with the present invention.

Referring to FIG. 1, there is shown an internal combustion engine in accordance with an embodiment of the present invention. The internal combustion engine shown throughout the Figures is generally designated by the reference numeral 10.

The engine 10 includes a casing, for example the external casing generally designated by the reference numeral 12. Typically, the external casing 12 has a substantially disc-shaped configuration although the configuration of the external casing 12 could vary without departing from the scope of the present invention. The casing 12 includes a casing wall 14 typically provided with reinforcement ribs 16, better illustrated in FIG. 4. Typically, although by no means exclusively, the external casing 12 could be made up of two separate pieces, such as shown more specifically in FIG. 2, for ease of assembly and disassembly. In these embodiments, a retaining ring 15, shown in FIG. 3, attaches the two separate pieces to each other.

The external wall 14 is provided with a pair of substantially circumferential venting grids 18 extending therethrough. A substantially annular air outlet grid 20 is provided for facilitating the exhaust of hot air. A substantially concentrically disposed inlet grid 22 is provided for allowing the entry of air within the external casing 12.

As illustrated more specifically in FIGS. 3 through 5, the engine 10 includes a main shaft 24 mechanically coupled to a ring gear 26 by a set of supports arms 27 allowing the main shaft 24 and the gear ring gear 26 to rotate freely relative to their respective rotational axis about guiding tubes 28, 30, used respectively for the upper and lower shaft segments. The ring gear 26 is mechanically coupled to an output element for producing an output rotational motion.

As with conventional internal combustion engines, the engine 10 includes at least one, and preferably, a set of piston and associated piston chambers. Typically, although by no means exclusively, the engine 10 includes four piston and piston chamber combinations. The engine 10 being substantially toroidal in configuration, the pistons and associated piston chambers are typically curved so that the combination thereof extends substantially across 360 degrees.

Figure 9:
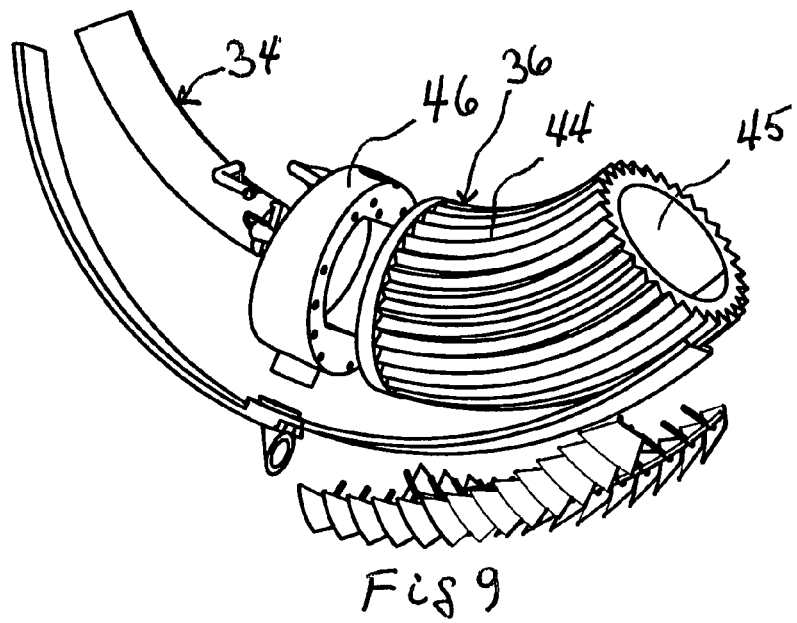
FIG. 9, in an exploded view, illustrates some of the details of cylinders and pistons part of the internal combustion engine in accordance with the present invention.

FIGS. 8 and 9 illustrate a typical piston and piston chamber configuration including a piston generally indicated by the reference numeral 34 and a cylinder generally indicated by the reference numeral 36. The piston 34 includes a piston head 38 having conventional sealing rings 40 or the like about its circumferential edge. The piston 34 further includes corresponding piston wrist or rod 42 extending from the piston head 38. The cylinder includes a cylinder wall 44 and a cylinder head 46, the cylinder wall 44 and the cylinder head 46 defining a combustion chamber 45 extending from the cylinder head 46.

The piston and cylinder 34, 36, and consequently the combustion chamber 45, have a substantially curved configuration so as to define corresponding arc segments. The radius of curvature of the piston 34 and cylinder 36 components 34 are substantially similar so as to allow a given piston component 34 to reciprocate within an adjacent cylinder component 36.

The cylinder 36 is mounted to the casing 12 so as to be movable relatively thereto along a substantially annular path extending in a substantially concentric relationship relatively to the combustion chamber 45, the substantially annular path having a path radius of curvature substantially similar to a radius of curvature of the combustion chamber 45. In addition, the piston 34 is mounted to the casing 12 so as to be movable relatively thereto along the substantially annular path. As described in further details hereinbelow, a unidirectional coupler operatively couples at least one of the cylinder 36 and the piston 34 to the casing 12 such that the at least one of the cylinder 36 and the piston 34 is unidirectionally movable relatively to the casing. In some embodiments of the invention, the unidirectional coupler operatively couples the cylinder 36 and the piston 34 to the casing 12 such that both the cylinder 36 and the piston 34 are unidirectionally movable relatively to the casing in a common predetermined direction. In some embodiments of the invention, each piston 34 extends from a corresponding cylinder 36 that is adjacent to the cylinder 36 in which the piston 34 reciprocates. In these embodiments, the cylinder supporting components 48 therefore also each support a respective piston 34.

The length or depth of a given cylinder 36 is typically function of the number of piston/cylinder combinations in a given internal combustion engine 10. Typically, the length or depth of the cylinders 36 is determined by dividing 360 degrees by twice the number of cylinders 36 within the engine minus 2. Hence, for a four-cylinder engine, the length of the arm segments formed by each individual cylinder 36 is substantially in the range of 60 degrees. Similarly, the length of the arm segments formed by each individual piston 34 is also substantially in the range of 60 degrees. It should, however, be understood that the length of the cylinders 36 and pistons 34 could vary without departing from the scope of the present invention. Each cylinder 36 is supported by a corresponding cylinder supporting component 48, better seen in FIG. 5.

As shown more specifically on FIG. 17a, each cylinder head 46 is provided with a corresponding spark plug 50 and valves 52, one of which is an input valve and the other one of which is an output valve, only one of which is shown in FIG. 17a. The valves 52 are adapted to work jointly with corresponding valve seats about corresponding valve apertures 53 formed in the cylinder head 46.

As seen in FIG. 5, a reciprocal substantially arc-shaped movement of the piston components 34 is transmitted to the main shaft 24 by a planetary gear train generally designated by the reference numeral 51. Linkage arms 54 mechanically coupled to corresponding cylinder attachment components 48 are used for mechanically coupling diametrically opposed cylinder components 36 so that each pair of diametrically opposed cylinder components 36 and their associated piston components 34 will reciprocate jointly. Hence, when four cylinder/piston combinations 36/34 are used, the cylinder/piston combinations 36, 34, are grouped in pairs that are adapted to reciprocate jointly about corresponding arc segments to their corresponding linkage arms 54 moving in a substantially scissor-like relationship relative to each other. This results in pistons 34 and cylinders 36 that are operatively coupled to each other such that the these pistons 34 and cylinders 36 reciprocate respectively relatively to their combustion chambers 45 so as to be pairwise out of phase by about 180 degrees relatively to each other.

Each linkage arm 54 is mechanically coupled to a corresponding planetary gear base 56 for movement jointly therewith. A corresponding planetary-type gear 52 is rotatably mounted on each corresponding planetary gear base 56. During operation of the engine 10, the ring gear 26 may either be driven by the planetary-type gears 52 or, alternatively, the ring gear 26 may drive the planetary-type gears 52 depending on the operational stroke or stage of a given piston-cylinder combination 34, 36.

The driving relationship between the ring gear 26 and the planetary-type gears 52 is controlled through a pair of sun gears 58. These sun gears 58 are adapted to act as ratchet-type means. The sun gears 58 are adapted to rotate freely in one direction and to be locked from rotation in the other rotational direction. During the compression and exhaust stages of the combustion cycle, the sun gears 58 are adapted to rotate freely, allowing the ring gear 26 to drive the planetary-type gears 52. Conversely, during the intake and explosion stages of the combustion cycle, the sun gears 58 are blocked, hence allowing the ring gear 26 to be driven by the planetary-type gears 52. In other words, the sun gears 58 each mounted to the casing 12 so as to be rotatable unidirectionally about a rotation axis in a direction opposite to the direction of movement of the cylinders 36 and pistons 34.

As illustrated more specifically in FIGS. 11, 12, the engine 10 is further provided with a valve actuator for selectively opening and closing the valve apertures 53 using the valves 52. The valve actuator includes corresponding push rods 60 which are attached to the linkage arms 54 for moving jointly therewith. Typically, a pair of cam components 66 is attached to each linkage arm 54 at substantially diametrically opposed locations. Each cam component 66 defines a corresponding cam 64 and is configured so as to allow movement of the push rods 60 without interfering with the latter.

A cursor riding on the cam 64 in the form of a push rod actuating component 62 operatively couples the push rods 60 to the cam component 66 in a manner such that relative movements between the linkage arms 48 moves said push rod actuating component 62 relatively to said cam 64 so as to selectively open and close said valves 52 as a function of the phase of the movement of the pistons 34 relatively to the cylinders 36.

Indeed, as is well known, in most four-stroke internal combustion engines, it is necessary to open and close both the inlet and outlet valves 52 during each stage or cycle of operation. When a given cylinder is at the explosion phase, following the ignition of the corresponding spark plug 50, both valves 52 are closed. Then, during an exhaust phase of the explosion cycle, the output valve is opened to allow evacuation of exhaust gases. Afterwards, during an admission phase, the input valve is opened to allow admission of air and fuel into the engine 10. Finally, during a compression phase preceding another explosion phase, both valves 52 are closed again. The reader skilled in the art will readily appreciate that there are many different manners of synchronizing the opening and closing of the valves 52 and such manners will therefore not be described in further details.

Referring now more specifically to FIGS. 13-16, there is shown the relative movement between the pistons and cylinders 34, 36 during the four phases of a given combustion cycle. For sake of clarity, the four cylinders 36 are designated respectively by the reference numerals 36a through 36d and the four pistons 34 are designated respectively by the reference numerals 34a through 34d In FIG. 13, the cylinder 36a is shown at the beginning of the explosion phase of the cycle. The planetary gear 52 to which the piston 34a is coupled being blocked from rotation, the cylinder 36a is projected forwardly and the ring gear 26 is driven by the planetary-type gears 52 to which the cylinder 36a is coupled to arrive at the configuration seen in FIG. 14. In this configuration, the exhaust phase, starts for the cylinder 36 as the explosion within the cylinder 36d drives the piston 34a forwardly into the cylinder 36a to obtain the configuration shown in FIG. 15. The admission phase then starts as the explosion within the cylinder 34c leads to the configuration shown in FIG. 16. This explosion pushes the cylinder 34a forwardly. Afterwards, the configuration of FIG. 13 is cycled back to, with all cylinders having moved forwardly as the explosion of the cylinder 36b pushes the piston 34a forwardly. During the explosion cycle shown in FIGS. 13 to 16, the opening and closing of the input and output valves occurs in a conventional pattern, as described hereinabove.

Movements of the push rod actuating component 62 relatively to the cam 64 and the resulting movements of the push rods 60 are shown in FIGS. 17a to 17d. In addition the configuration of the cam 64 and of the rod actuating component 62 are also better illustrated in FIG. 18.

During operation of the engine, the surrounding air is sucked through the inlet apertures of the casing 12 maintains the positive pressure within the engine 10. The heated air flows upwardly and is evacuated through the corresponding outlet rib 20.

As seen in FIG. 10, each cylinder component 36 is fluidly coupled to a corresponding peripheral gas outlet duct 68 by corresponding cylinder exhaust outlets 70. The peripheral exhaust duct 68 leads to an exhaust aperture 82 shown more specifically in FIG. 3.

Referring now more specifically to FIGS. 10 and 19, there is shown in greater details some of the gas and air inlet features. Air sucked in through the inlet grids 22 is first filtered through an air filter generally indicated by the reference numeral 72 before being distributed by corresponding air inlet ducts 74. In some embodiments of the invention, the air filter is configured to compress the air distributed through the air inlet ducts 74 and therefore acts as an air compressor. For example, this is achievable by configuring the air filter such that it includes a propeller-like component rotatable by the linkage arms 54 and oriented to force the air towards the air inlet ducts 74. Gas is distributed through corresponding gas inlet ducts 76. The gas inlet ducts 76 are. In turn, fluidly coupled to corresponding gas distribution rings 78 mounted about the peripheral surface of the tube 28 for allowing rotation of the latter. Rotation of the tube 28 creates a suction force drawing gas into an inlet pipe 80.

Each cylinder component 36 is provided with a corresponding spark plug 50 operationally coupled to a corresponding sensor for igniting a spark when the corresponding piston reaches a suitable compression stage.

As seen in FIG. 5, a magneto/starter 110 provides electrical current to the spark plugs 50. When the compression of the cylinder has reached a predetermined value, a given circuit confirms that the outlet and admission valves are closed. Once the circuit has determined that the admission and outlet valves are closed, current is sent to the spark plugs. If a sensor senses that both the admission and exhaust valves are not closed, current is not sent to the ignition plug.

The sun gears 58 are each selectively operable in an engaged configuration and in a disengaged configuration, wherein in the engaged configuration, the first sun gears 58 are unidirectionally movable relatively to the casing 12 and in the disengaged configuration, the sun gears 58 are bidirectionally movable relatively to the casing 12. A starter motor of the magneto/starter 110 is operatively coupled to the linkage arms 54 for starting the combustion engine 10. A starter controller (not shown) is operatively coupled to the sun gears 58 and to the starter motor for energizing the starter motor to rotate the linkage arms 54 and alternatively operating each of the sun gears 58 in the engaged and disengaged configurations. Alternatively operating each of the sun gears 58 in the engaged and disengaged configurations causes the pistons 34 to reciprocate within their respective cylinders 36 to allow starting the internal combustion engine.

Electrical current is supplied, at least in part, to the motor 10 through the use of an induction coil part of the magneto/starter 110. The induction coil 98 is adapted to be charged upon rotation of the components of the engine 10 and to be electrically coupled to the battery (not shown) through corresponding electrical coupling prongs (not shown).

As illustrated in greater details in FIG. 4, the engine 10 includes an oil reservoir or pan 102 adapted to collect the oil emanating from the internal components of the engine 10. Oil contained within the oil pan 102 is pumped through corresponding oil inlet duct 104 by a suitable oil pump and distributed using oil distribution ducts 106 shown in greater details in FIG. 10.

As shown in FIG. 10, gas and oil inlet ducts 76, 106 are grouped in pairs for feeding the pistons 34. The gas and oil inlet ducts 76, 106 are fluidly coupled to peripheral reservoirs 78. These peripheral reservoirs 78 are, in turn, fluidly coupled to the main gas and oil ducts 80, 104. Since the gas and oil inlet ducts 76, 106 are adapted to reciprocate with their corresponding piston-cylinder combinations, a sealing joint is provided between the reservoirs 78 and the corresponding gas and oil inlet ducts 76, 106.

The cylinders 36 include wings 112 located substantially radially outwardly relatively to the central shaft 28. The wings 112 provide cooling of the internal combustion engine 10 by drawing air through the inlet grid 22. In some embodiments of the invention, the wings 112 are angled relatively to the annular path along which the cylinders 36 move to draw air more efficiently through the inlet grid 22.

Although the present invention has been described hereinabove by way of preferred embodiments thereof, it can be modified, without departing from the spirit and nature of the subject invention as defined in the appended claims.

What is claimed is:

1. An internal combustion engine usable for producing a rotational output, said internal combustion engine comprising:

a casing;

a first cylinder defining a first cylinder head and a first combustion chamber extending from said first cylinder head, said first combustion chamber being substantially arc segment shaped and defining a first chamber radius of curvature, said first cylinder being mounted to said casing so as to be movable relatively thereto along a substantially annular path extending in a substantially concentric relationship relatively to said first combustion chamber, said substantially annular path having a path radius of curvature substantially similar to said first chamber radius of curvature;

a first piston, said first piston being operatively coupled to said first cylinder so as to be reciprocatingly movable within said first combustion chamber, said first piston being mounted to said casing so as to be movable relatively thereto along said substantially annular path;

a second cylinder defining a second cylinder head and a second combustion chamber extending from said second cylinder head, said second combustion chamber being substantially arc segment shaped, said second cylinder being mounted to said casino so as to be movable relatively thereto along said substantially annular path, said first and second combustion chambers having substantially similar radii of curvature;

a second piston, said second piston being operatively coupled to said second cylinder so as to be reciprocatingly movable within said second combustion chamber, said second piston being mounted to said casing so as to be movable relatively thereto along said substantially annular path;

a central shaft extending substantially perpendicularly to said substantially annular path, said central shaft defining a rotation axis extending substantially centrally and longitudinally relatively thereto;

a first linkage arm rotatably mounted to said central shaft, said first linkage arm mechanically coupling said first cylinder and said second piston to each other;

a second linkage arm rotatably mounted to said central shaft, said second linkage arm mechanically coupling said second cylinder and said first piston to each other;

said first and second linkage arms being each unidirectionally rotatable in a common predetermined direction relatively to said central shaft;

an output element operatively coupled to said first and second cylinders and to said first and second pistons for producing said rotational output; and a unidirectional coupler operatively coupling said first cylinder and said first piston to said casing such that both said first cylinder and said first piston are unidirectionally movable relatively to said casing in said common predetermined direction, wherein said first and second pistons and said first and second cylinders are operatively coupled to each other such that said first and second pistons reciprocate respectively relatively to said first and second combustion chambers so as to be out of phase by 180 degrees relatively to each other, said first cylinder and said second piston being mechanically coupled to each other so as to be jointly movable along said substantially annular path and said second cylinder and said first piston being mechanically coupled to each other so as to be jointly movable along said substantially annular path; and wherein said output element includes a planetary gear train, said planetary gear train including:
  a first and a second sun gear each mounted to said casing so as to be rotatable unidirectionally about said rotation axis in a direction opposite to said predetermined direction;
  a ring gear rotatably mounted to said casing concentrically to said first and second sun gears, said ring gear being rotatable about said rotation axis;
  a first planetary gear mounted between said first sun and ring gears, said first planetary gear being rotatably mounted to said first arm;
  a second planetary gear mounted between said second sun and ring gears, said second planetary gear being rotatably mounted to said second arm;
  said first and second planetary gears being mounted respectively to said first and second arms such that a rotation of said first and second arms relatively to said casing moves respectively said first and second planetary gears relatively to both said planetary and said first and second sun gears and thereby produces a rotation of said ring ear relatively to said casing.

2. An internal combustion engine as defined in claim 1, comprising
  a third cylinder defining a third cylinder head and a third combustion chamber extending from said third cylinder head, said third combustion chamber being substantially arc segment shaped, said third cylinder being mounted to said first linkage arm, said first and third combustion chambers having substantially similar radii of curvature;
  a fourth cylinder defining a fourth cylinder head and a fourth combustion chamber extending from said fourth cylinder head, said fourth combustion chamber being substantially arc segment shaped, said fourth cylinder being mounted to said second linkage arm, said first and fourth combustion chambers having substantially similar radii of curvature;
  a third piston, said third piston being operatively coupled to said third cylinder so as to be reciprocatingly movable within said third combustion chamber, said third piston being mounted to said second linkage arm; and
  a fourth piston, said fourth piston being operatively coupled to said fourth cylinder so as to be reciprocatingly movable within said fourth combustion chamber, said fourth piston being mounted to said first linkage arm.

3. An internal combustion engine as defined in claim 2, wherein said first, second, third and fourth cylinders each extend over about 60 degrees.

4. An internal combustion engine as defined in claim 1, wherein said first and second sun gears are each selectively operable in an engaged configuration and in a disengaged configuration, wherein in said engaged configuration, said first and second sun gears are unidirectionally movable relatively to said casing and in said disengaged configuration, said first; and second sun gears are bidirectionally movable relatively to said casing.

5. An internal combustion engine as defined in claim 4, further comprising a starter motor operatively coupled to said first and second linkage arms for starting said combustion engine.

6. An internal combustion engine as defined in claim 5, further comprising a starter controller operatively coupled to said first and second sun gears and to said starter motor for
  energizing said starter motor to rotate said first and second linkage arms;
  alternatively operating each of said first and second sun gears in said engaged and disengaged configurations, said first sun gear being in said engaged configuration when said second sun gear is in said disengaged configuration and said first sun gear being in said disengaged configuration when said second sun gear is in said engaged configuration;
  whereby alternatively operating each of said first and second sun gears in said engaged and disengaged configurations causes said first and second pistons to reciprocate within respectively said first and second combustion chamber to allow starting said internal combustion engine.

7. An internal combustion engine as defined in claim 1, wherein
  said first cylinder head defines an input valve aperture and an output valve aperture;
  said first cylinder head includes an input valve and an output valve, said input and output valves being mounted substantially adjacent respectively to said input and output valve apertures, said input and output valves being each movable so as to selectively open and close said input and output valve apertures.

8. An internal combustion engine as defined in claim 7, further comprising a fuel admission line extending from said input valve substantially radially inwardly toward said rotation axis.

9. An internal combustion engine as defined in claim 7, further comprising an oil pan and an oil duct extending substantially radially between said oil pan and said first cylinder, said oil duct and said first cylinder being movable substantially jointly relatively to said casing.

10. An internal combustion engine as defined in claim 7, further comprising
  an air compressor operatively coupled to said first cylinder for compressing air when said first cylinder moves along said substantially annular path; and
  an air admission line extending between said air compressor and said input valve for providing said compressed air to said first cylinder.

11. An internal combustion engine as defined in claim 1, wherein said first cylinder includes wings extending substantially radially outwardly from said first cylinder.

* * * * *